United States Patent

[11] 3,598,019

| [72] | Inventor | Henry R. Killian<br>Greensburg, Pa. |
|---|---|---|
| [21] | Appl. No. | 851,379 |
| [22] | Filed | Aug. 19, 1969 |
| [45] | Patented | Aug. 10, 1971 |
| [73] | Assignee | Walworth Company<br>New York, N.Y. |

[54] PRESSURE FLUID ACTUATOR
7 Claims, 4 Drawing Figs.

[52] U.S. Cl. ........................................... 91/347,
91/350, 91/468, 91/469
[51] Int. Cl. ........................................... F01l 31/02,
F15b 13/042
[50] Field of Search........................................ 91/347,
350, 468, 469

[56] References Cited
UNITED STATES PATENTS

| 2,090,575 | 8/1937 | De Motte ..................... | 91/347 |
| 2,769,298 | 11/1956 | Jones............................ | 91/347 |
| 2,841,119 | 7/1958 | Segersted ..................... | 91/347 |
| 2,907,550 | 10/1959 | Heinish ........................ | 91/347 |

Primary Examiner—Paul E. Maslousky
Attorney—Melvin R. Stidham

ABSTRACT: An intermittent drive mechanism comprising a piston which is selectively driven to reciprocate a link carrying a pawl to turn a ratchet wheel through an angular increment. Pressure fluid, when introduced to the piston inlet line, forces a check valve to seal against an exhaust port and close the fluid system to start the piston stroke. At the end of the stroke, a switch is tripped to back the check valve from the exhaust port and against the inlet port to seal it off. With pressure off, a spring returns the piston and then the switch is again tripped to release the check valve for another cycle.

INVENTOR.
HENRY R. KILLIAN

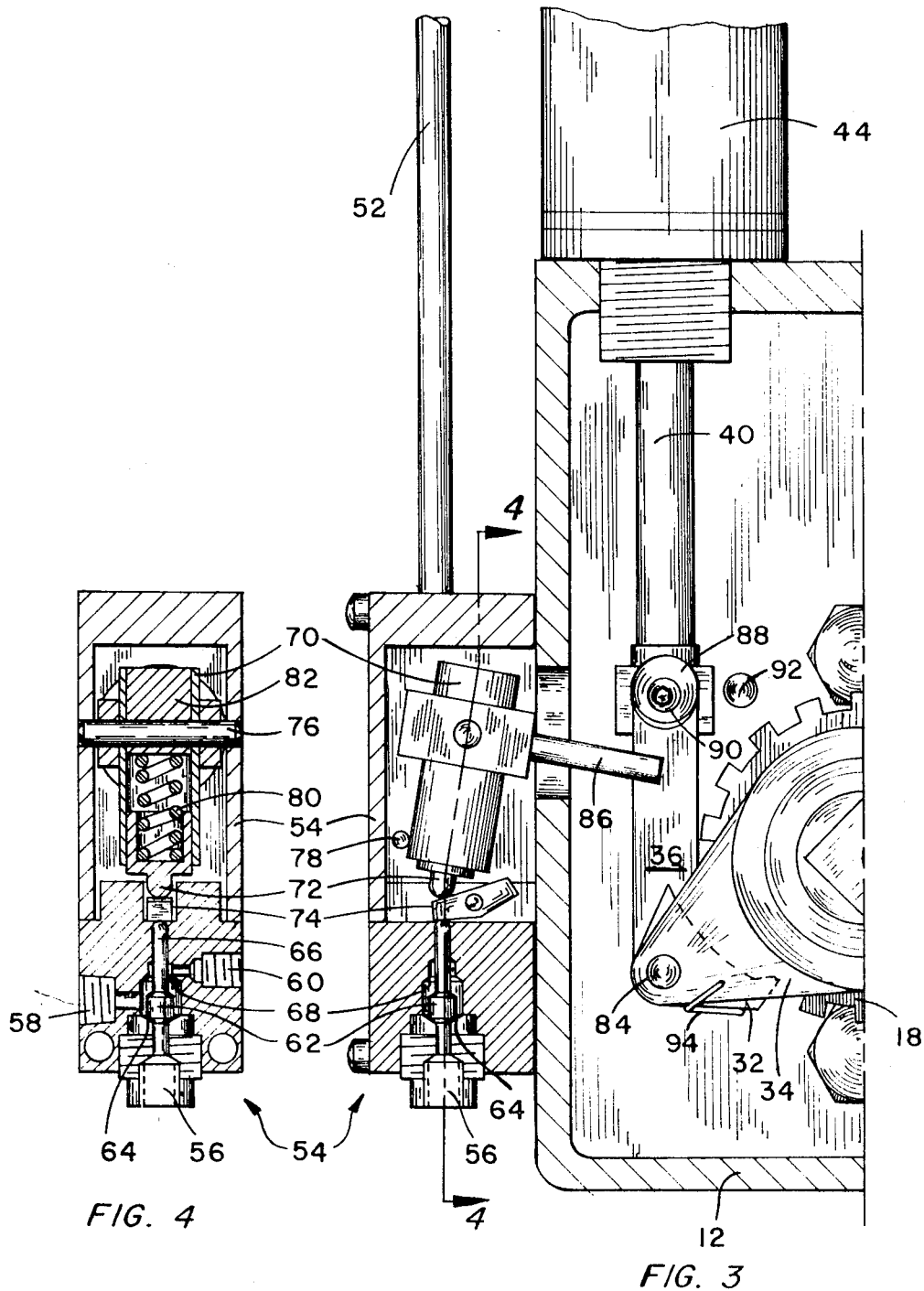

PRESSURE FLUID ACTUATOR

BACKGROUND OF THE INVENTION

This invention relates to a pressure fluid actuator and, more particularly, to an intermittent rotary drive which is pressure fluid actuated to produce a series of repeated rotational increments in a rotary output member.

Conventional pressure fluid, piston valve actuators for operation of a reciprocating valve member, such as a valve gate, are connected directly to a valve stem to drive the stem in either direction. Such cylinder operators have to be long enough to accommodate the full stroke of the valve closure member and can, therefore, add appreciably to the overall dimension of the valve. Moreover, the direct connection of the piston rod to a reciprocally mounted shaft generally precludes adaptation for manual operation in the event of failure of the fluid pressure and, if it is necessary to remove the cylinder operator for repairs, there is a resultant loss of valve position control. Further, such direct drive piston operators must be designed to overcome the large breakaway force required to open the valve while line pressure is urging it against its downstream seat. Particularly in the case of air cylinder actuators, the compressible medium produces a jumping tendency when the break away force is overcome.

OBJECTS OF THE INVENTION

Accordingly, it is an object of this invention to provide a pressure fluid actuator which is compact and capable of delivering a substantial operating torque.

It is a further object of this invention to provide a pressure fluid actuator to deliver a multiturn output, as to a threaded stem, in either direction as desired.

It is a further object of the invention to provide a pressure fluid actuator which, when inactivated, permits manual operation of the rotary output member.

It is a further object of this invention to provide a pressure fluid actuator which, in the event of failure of the actuating medium, automatically conditions the output member for manual operation.

It is a further object of this invention to provide a pressure fluid actuator with selected piston size in accordance with the torque demands in either direction.

It is a further object of this invention to provide a pressure fluid actuator capable of delivering a substantially constant torque output.

Other objects and advantages of the invention will become apparent from the detailed description herein when read in conjunction with the accompanying drawing.

BRIEF DESCRIPTION OF THE INVENTION

In carrying out this invention, there is provided a ratchet wheel which is driven selectively by either of two diametrically opposed pawls, depending upon the direction of rotation desired. The pawls are driven by pressure fluid operated cylinders dispersed side by side to operate on opposite arcuate sides of the ratchet wheel. Operation is commenced by directing pressure fluid to a check valve controlling the selected cylinder, the fluid drives the check valve downstream to seal off an exhaust port and to bring a cylinder loading duct into communication with the cylinder. As the piston extends, it carries the pawl to rotate the ratchet wheel through a partial turn. At the end of its stroke a trip pin moving with the pawl trips a switch which engages a rocker that depresses the valve away from the exhaust seat and against the inlet seat. This shuts off pressure and opens the cylinder loading duct to the exhaust, enabling a spring to return the piston. Near the end of the return stroke, the pawl engages a disabling stop that pivots it away from the ratchet wheel freeing it for manual operation, if such were desired; and a second trip pin trips the valve switch again to condition it for pressurizing operation. This cycle is repeated until the desired number of turns is delivered to the output shaft.

BRIEF DESCRIPTION OF THE DRAWING

FIG. 3 is an enlarged partial section view showing another stage of operation, and FIG. 4 is a section view taken along line 4-4 of FIG. 3.

DESCRIPTION OF A PREFERRED EMBODIMENT

Figure 1:
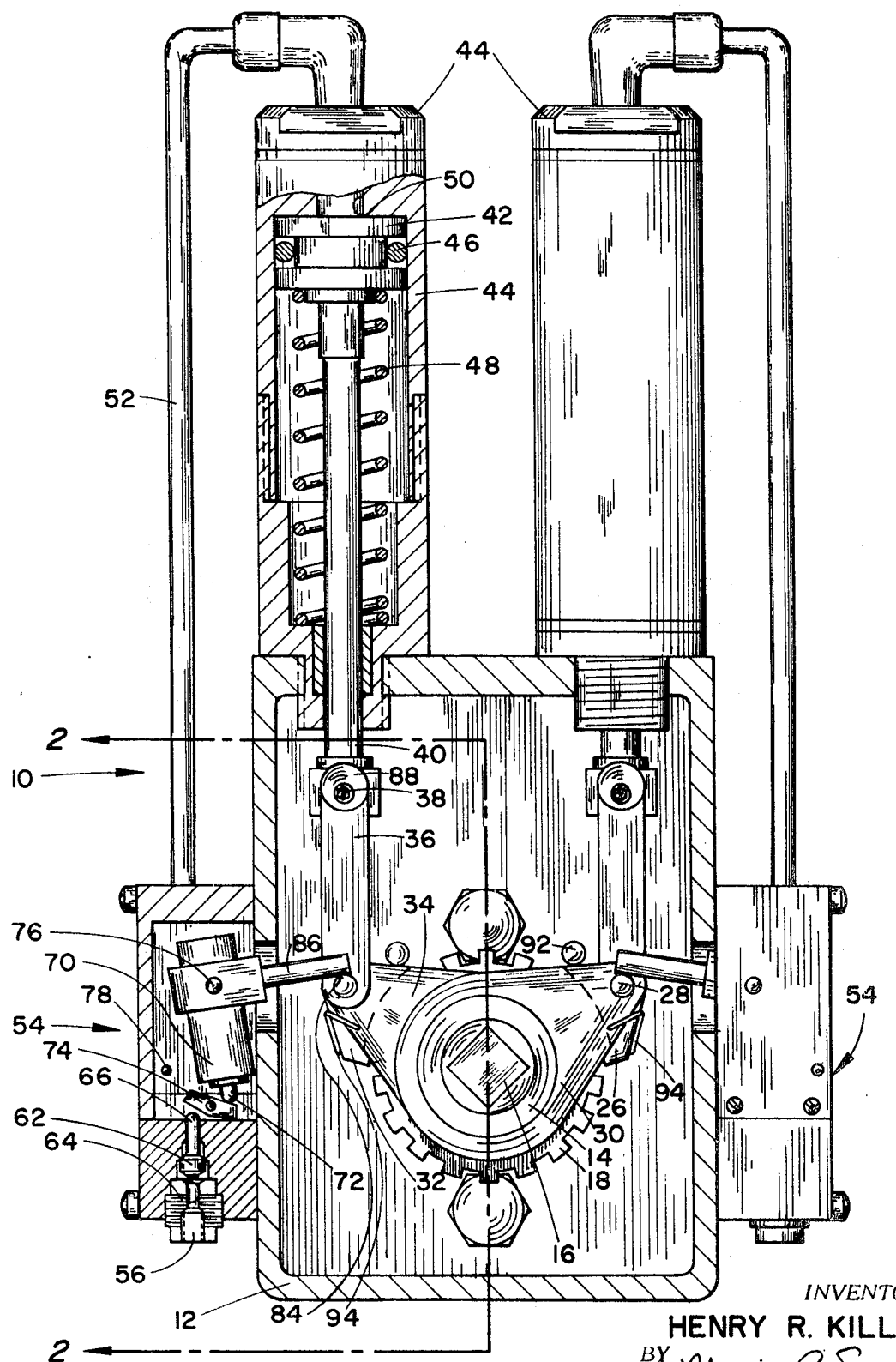
FIG. 1 is an elevation view partly in section of a pressure fluid actuator embodying features of this invention.
Figure 2:
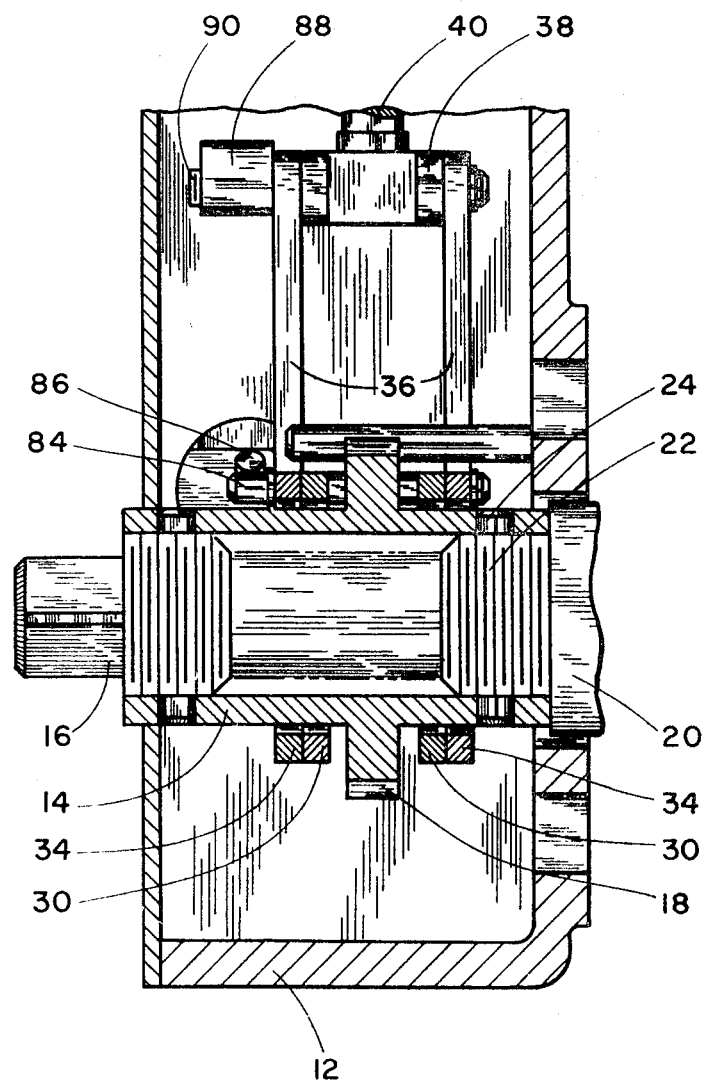
FIG. 2 is a section view taken along line 2-2 of FIG. 1.

Referring now more particularly to FIG. 1, the pressure fluid actuator of this invention 10 includes a housing 12 in which is rotatably mounted a hollow shaft 14. A plug with a square nut or the like 16 is secured in one end of the hollow shaft for manual rotation of the shaft. As shown in FIG. 2, the shaft 14 may be formed with a ratchet wheel 18 integral therewith, or if desired, the ratchet wheel may be keyed, spline or otherwise secured to the shaft. In any case, the shaft 14 may be rotated manually by turning the nut 16 or mechanically by turning the ratchet wheel 18. Also as shown in FIG. 2, an output shaft 20, such as a valve stem nut, may be secured to the hollow input shaft 14 as by threading at 22 and locking the shafts together with suitable pin means 24.

The ratchet wheel 18, and hence the shaft 14, is turned in a clockwise direction in FIG. 1 in response to engagement therewith by a pawl 26 pivotally supported at 28 on a clockwise drive pawl carrier 39 rotatably carried on the hollow shaft 14. Thus, as will be described in greater detail, when the pawl carrier arm 30 is swung through an arc in a clockwise direction about the shaft 14, the pawl 26 will engage and rotate the ratchet wheel 18 through substantially the same arc. Counterclockwise rotation of the ratchet wheel 18 is produced by a counterclockwise drive pawl 32 pivotally carried on the ratchet wheel shaft 14. The mechanisms for driving the clockwise and the counterclockwise pawl carrier arms 30 and 34 are identical. Therefore, a description of one will suffice for both.

Pivotally connected to the pawl carrier arm 30 or 34 is a link 36 which, in turn, is pivotally connected at 38 to the rod 40 of a piston 42. The piston 42 is slidably carried within a cylinder 44, carrying a suitable seal ring 46. A strong spring 48 biases the piston 42 into its retracted position shown in FIG. 1, and the piston is driven into its extended position by means of a pressure fluid, such as compressed air delivered at the cylinder intake port 50 by suitable duct 52.

Referring now to FIGS. 1, 3 and 4; valve and switching units 54 are secured to the sides of the housing 12 and each includes a compressed air or hydraulic inlet 56, an outlet port 58 to which the duct 52 is connected, and an exhaust port 60. A poppet type check valve 62 is driven downstream by inlet pressure to seal against a downstream seat 68 and shut off the exhaust port 60, simultaneously opening the inlet port 56 to the outlet port 58. This pressurizes the cylinder 44 and drives the piston 42 to its extended position. If the check valve stem 66 is thereafter depressed, the valve 62 is forced to seal against an upstream seat 64 shutting off the inlet port 56 and opening the outlet port 58 to the exhaust port 60. This exhausts the cylinder 44 and allows the spring 48 to retract the piston 42 to the position shown in FIG. 1.

Depression of the valve stem 66 is accomplished by means of a switch device 70 pivotally mounted in the valve housing 54. (FIGS. 1, 3 and 4.) When the switch is in the position shown in FIG. 1, the spring pressed plunger 72 holds the rocker 74 free of the valve stem 66 so that the valve 62 is free to be driven by pressure fluid against the downstream seat 68. However, when the switch 70 is pivoted about the pin 76 in a clockwise direction, the biased plunger 72 slides along the rocker 74 until the switch rocks past center and rests against the stop 78. In this position, the spring 80, acting between the plunger 72 and a plug 82 biases the plunger outward to pivot the rocker 74 and depress the valve stem 66 to urge the valve 62 against the upstream seat 64.

When the spring 48 returns the piston 42 to the retracted position of FIG. 1, a trip pin 84 carried on the link 36 engages the air switch trip arm 86 to pivot the switch in a counterclockwise direction, inactivating the rocker 74 and allowing the valve 62 to seal against the downstream seat 68 and open the outlet port 58 to the inlet port 56. Then, when the piston returns the link to the extended position from which it is returning in FIG. 3, a second trip pin 88 engages the trip arm 86 to pivot the switch into the position shown in FIG. 3 wherein the plunger depresses the rocker 74 and the valve stem 66. This seals the inlet seat 64 and opens the outlet port 58 to the exhaust, allowing the spring 48 to return the piston 42. At least one of the trip pins, preferably pin 88, is made adjustable by mounting it eccentrically at 90.

In their quiescent positions shown at FIG. 1, the pawl carriers 30 and 34 are held by the piston springs 48 against combination stops and pawl release pins 92 which define the limit position of the carrier arms 30 and 34 and hold the pawls 26 and 32 free of the ratchet wheel 18 against the force of the pawl springs 94. Then, when the pressure fluid is introduced to the inlet port 56, it drives the valve 62 against the downstream seat, opening the inlet port 56 to the outlet port 58. With the resulting pressurization of the duct 52 and the cylinder 44, the piston is driven through a stroke which continues until the adjustable trip pin 88 engages the switch trip arm 86. The arm is rocked to the position shown in FIG. 3 wherein the switch plunger 72 depresses the rocker 74 and the valve stem 66, forcing the valve against the upstream seat 64 to shut off the inlet port 56 and connect the outlet port 58 to the exhaust 60.

With the cylinder so relieved of pressure, the spring 48 returns the piston 42 to its retracted position with the pawl 32 pivoting freely over the teeth of the ratchet. Near the end of this return stroke, the combination stop and pawl release pin 92 is engaged, first by the pawl 32 to pivot the pawl free of engagement with the ratchet wheel 18, and then by the carrier arm 34 to stop further movement. Also near the end of the stroke, the switch trip arm 86 is engaged by the trip pin 84 to pivot the switch counterclockwise to the position of FIG. 1, wherein the inlet pressure fluid again drives the valve 62 against the downstream seat and commences to pressurize the cylinder for another cycle. Each cycle delivers an increment of rotation, say 60°, to the output shaft 20, and the cycles are repeated automatically until the desired rotational movement is complete. For example, the output shaft 20 may constitute, or be coupled to, a threaded valve stem nut which will be turned through a number of revolutions during valve operation.

The cylinders 44 and pistons 42 may be of selected bore sizes in accordance with the torque requirements and, if desired, may be of different sizes in applications wherein a greater torque output is required in one direction as, for example, opening valve under high pressure.

While this invention has been described in conjunction with a preferred embodiment thereof, it is obvious that modifications and changes therein may be made by those skilled in the art without departing from the invention.

What I claim is:

1. An intermittent rotary drive mechanism comprising:
   a reciprocable drive member,
   a rotatable driven member,
   interengageable means on said drive and driven members for imparting an angular increment of rotation to said driven member in response to a stroke of said drive member in one direction only,
   a pressure fluid responsive member connected to said drive member to move said drive member in said one direction,
   a source of pressure fluid,
   a duct connecting said source to said pressure fluid responsive member,
   a check valve in said duct movable between a first position opening said duct to said source and a second position closing said duct to said source and opening said duct to a zone of low pressure,
   said check valve having an upstream seat in communication with said source and a downstream seat in communication with said zone of low pressure,
   a check valve member movable by pressure from said source to seal against said downstream seat,
   means operative when said duct is connected to said low pressure zone to move said pressure fluid responsive member in a direction opposite to said one direction,
   switch means operative in one position to hold said check valve member to seal against said upstream seat and in its other position to release said check valve member,
   first trip means on said drive member to engage and move said switch means into said one position upon completion of its movement in said one direction, and
   second trip means on said drive member to engage and move said switch means into said other position upon completion of its movement in said opposite direction.

2. The intermittent drive mechanism defined by claim 1 including:
   means for adjusting the position of one of said trip means longitudinally of said drive member.

3. The intermittent drive mechanism defined by claim 1 wherein said switch means comprises:
   a rocker member pivotable to rock in a given plane so that when one end is depressed it engages and holds said check valve member against said upstream seat, and when the other end is depressed said one end releases said check valve member, and
   a spring-pressed follower arm pivotably mounted to swing in said given plane and move along said rocker member between an active position wherein it depresses said one end of the rocker member and an inactive position wherein it depresses said other end of the rocker member.

4. The intermittent drive mechanism defined by claim 1 including:
   a reverse reciprocable drive member,
   interengageable means on said reverse drive member and said driven members for imparting an angular increment of rotation to said driven member in response to a stroke of said reverse drive member in a single direction only,
   a reverse pressure fluid responsive member connected to said reverse drive member to move said reverse drive member in said single direction,
   a source of pressure fluid,
   a conduit connecting said source to said reverse pressure fluid responsive member,
   a second check valve in said conduit movable by pressure from said source into a first position opening said conduit to said source and movable into a second position closing said conduit to said source and opening it to a zone of low pressure,
   means operative when said conduit is connected to said low-pressure zone to move said reverse pressure fluid responsive member in a direction opposite to said single direction,
   a switch member operative in one position to hold said second check valve in said second position and in its other position to release said second check valve,
   first trip means on said reverse drive member to engage and move said switch member into said one position upon completion of its movement in said reverse direction, and
   second trip means on said reverse drive member to engage and move said switch member into said other position upon completion of its movement in said opposite direction.

5. The intermittent drive mechanism defined by claim 1 wherein said interengageable means comprises:
   a pawl pivotally mounted on said drive member, and
   a ratchet wheel on said driven member, and including
   means engageable by said pawl when said drive member completes its movement in said opposite direction to interrupt said interengageable means.

6. The intermittent drive mechanism defined by claim 1 wherein said interengageable means comprises:
   a ratchet wheel fixed on said drive member,
   a pawl carrier rotatable on said driven member, a pivot connection between said carrier and said drive member so that said carrier oscillates through an arc concentric with said ratchet wheel in response to reciprocal movements of said drive member, a pawl on said pivot connection to pivot on said carrier, means biasing said pawl into engagement with said ratchet, and a stop member engageable during the final increment of movement of said drive member in said opposite direction first by said pawl in opposition to said biasing means, and then by said carrier to prevent further movement of said carrier and drive member.

7. The intermittent drive mechanism defined by claim 5 including:

means normally biasing said pressure fluid responsive member in a direction opposite to said one direction so that failure of fluid pressure will interrupt said interengageable means and free said driven member for rotation by means independent of said drive member.